(12) United States Patent
Gold et al.

(10) Patent No.: US 8,178,814 B2
(45) Date of Patent: May 15, 2012

(54) HAND-HELD ELECTRO-DISCHARGE DEVICE

(75) Inventors: Kenneth Gold, Bell Canyon, CA (US); Mervyn Rudgley, Mission Viejo, CA (US); Michael Gibbons, Costa Mesa, CA (US); James T. Legge, Rancho Palos Verdes, CA (US); Richard K. Gerlach, Rolling Hills Estates, CA (US)

(73) Assignee: Perfect Point EDM Corp., Huntington Beach, CA (US)

( * ) Notice: Subject to any disclaimer, the term of this patent is extended or adjusted under 35 U.S.C. 154(b) by 364 days.

(21) Appl. No.: 12/603,507

(22) Filed: Oct. 21, 2009

(65) Prior Publication Data
US 2010/0096365 A1    Apr. 22, 2010

Related U.S. Application Data

(60) Provisional application No. 61/196,806, filed on Oct. 21, 2008.

(51) Int. Cl.
*B23H 1/00* (2006.01)
*B23H 1/10* (2006.01)

(52) U.S. Cl. .............. 219/69.11; 219/69.14; 219/69.17; 219/69.2

(58) Field of Classification Search .............. 219/69.11, 219/69.2, 69.14, 69.15, 69.17; 251/149.6; 204/224 R, 224 M
See application file for complete search history.

(56) References Cited

U.S. PATENT DOCUMENTS

| | | | | | |
|---|---|---|---|---|---|
| 2,427,588 | A | * | 9/1947 | Burnett | 219/69.15 |
| 2,753,429 | A | * | 7/1956 | McKechnie | 219/69.2 |
| 3,346,477 | A | * | 10/1967 | Wolfer | 204/224 R |
| 3,354,073 | A | * | 11/1967 | Williams, Jr. et al. | 204/224 R |
| 3,474,013 | A | * | 10/1969 | Inoue | 204/224 M |
| 3,538,950 | A | * | 11/1970 | Porteners | 251/149.6 |
| 3,690,336 | A | * | 9/1972 | Drum | 251/149.6 |
| 4,441,004 | A | * | 4/1984 | Inoue | 219/69.15 |
| 4,711,981 | A | * | 12/1987 | Aso et al. | 219/69.12 |
| 4,922,074 | A | * | 5/1990 | Sebzda, Sr. | 219/69.15 |
| 4,990,737 | A | * | 2/1991 | Obara | 219/69.11 |
| 5,577,706 | A | * | 11/1996 | King | 251/149.6 |
| 5,618,449 | A | * | 4/1997 | Houman et al. | 219/69.11 |
| 5,741,963 | A | * | 4/1998 | Nakatani et al. | 73/114.58 |
| 6,225,589 | B1 | | 5/2001 | Bartok | |
| 6,385,500 | B1 | | 5/2002 | Hebbar et al. | |

(Continued)

FOREIGN PATENT DOCUMENTS

GB    2323551 A * 9/1998

(Continued)

OTHER PUBLICATIONS

International Search Report, PCT/US2009/061554, Jul. 2009.

(Continued)

*Primary Examiner* — Geoffrey S Evans
(74) *Attorney, Agent, or Firm* — Baker Hostetler LLP; Mark H. Krietzman

(57) ABSTRACT

The hand-held electro-discharge machining fastener removal device of this invention brings an EDM electrode and its supporting ground pin and dielectric fluid structure to a fastener in a workpiece, such as an aircraft fuselage. The hand-held device brings the dielectric fluid, power supply, and control system structure to the fastener in a compact tool to permit EDM machining to be brought to large structures.

23 Claims, 13 Drawing Sheets

U.S. PATENT DOCUMENTS

| | | |
|---|---|---|
| 6,521,856 B1 | 2/2003 | Marchesi et al. |
| 6,549,240 B1 | 4/2003 | Reitmeier |
| 6,556,886 B1 | 4/2003 | Riva et al. |
| 6,717,094 B2 | 4/2004 | Beaumont |
| 6,737,602 B2 | 5/2004 | Stelter |
| 6,759,620 B2 | 7/2004 | Marchesi et al. |
| 6,788,019 B2 | 9/2004 | Imai et al. |
| 6,844,518 B1 | 1/2005 | Coons et al. |
| 7,030,332 B2 | 4/2006 | Hastilow et al. |
| 7,537,610 B2 | 5/2009 | Reiss |
| 7,565,995 B2 | 7/2009 | Delmont |
| 7,594,987 B2 | 9/2009 | Lukic |
| 7,664,565 B2 | 2/2010 | Stammen |
| 7,679,031 B2 | 3/2010 | Yamazaki et al. |
| 2003/0173337 A1* | 9/2003 | Ito .............................. 219/69.14 |
| 2005/0184030 A1* | 8/2005 | Bermann et al. ........... 219/69.11 |
| 2008/0142488 A1 | 6/2008 | Luo |

FOREIGN PATENT DOCUMENTS

| | | |
|---|---|---|
| JP | 54-20247 A * | 2/1979 |
| JP | 2004-230517 | 8/2004 |

OTHER PUBLICATIONS

Written Opinion of the International Searching Authority, PCT/US2009/061554, Jul. 2009.

* cited by examiner

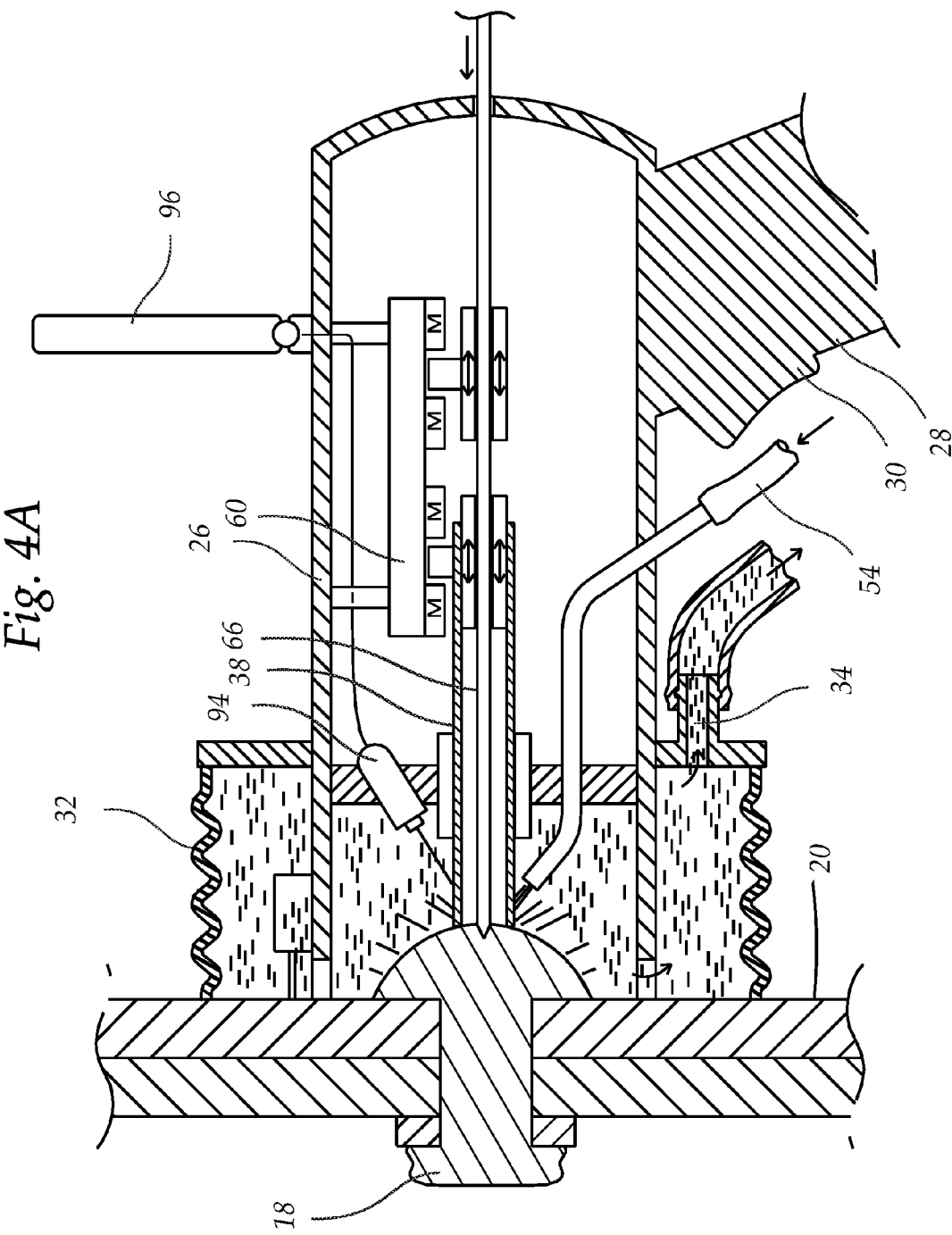

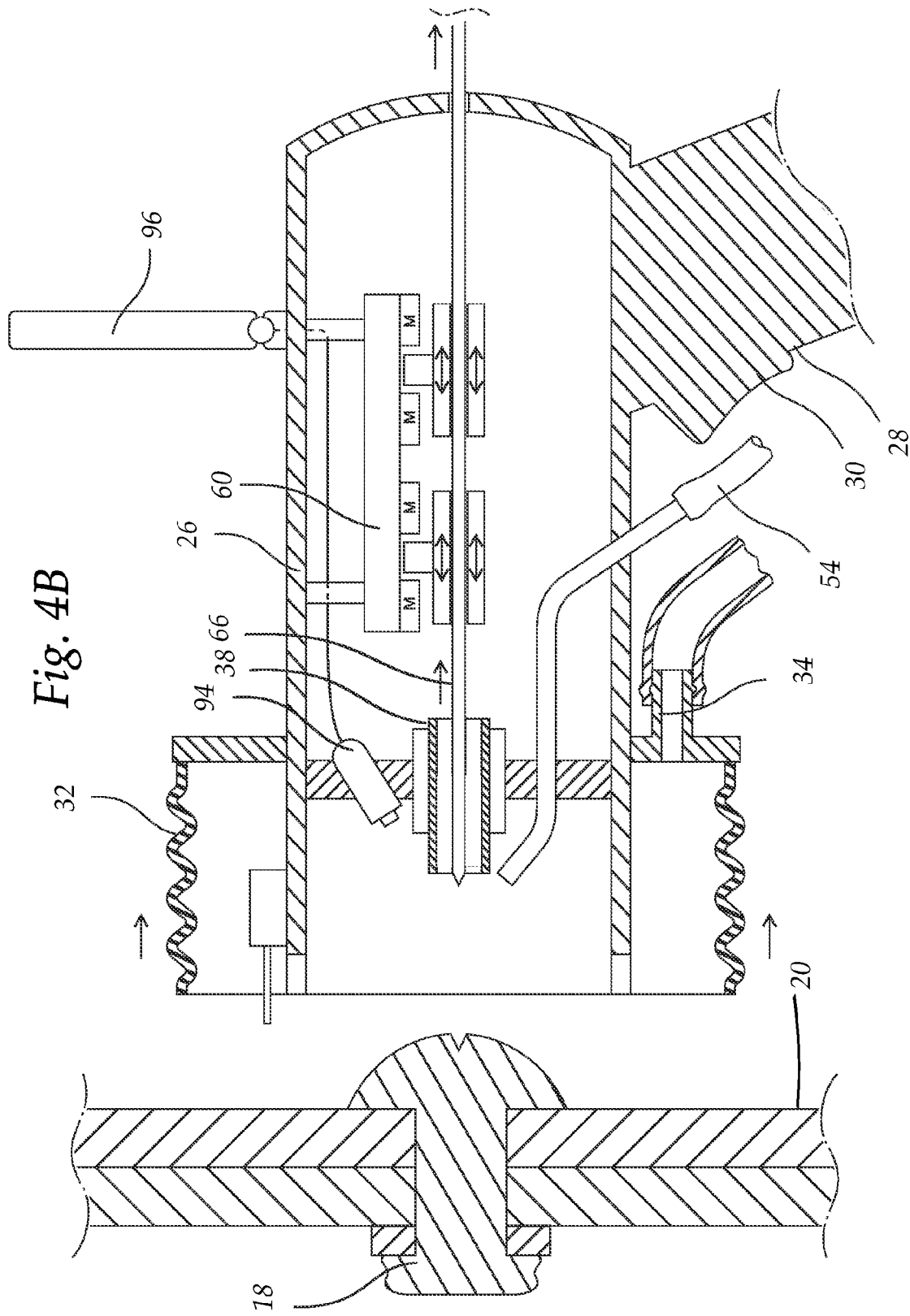

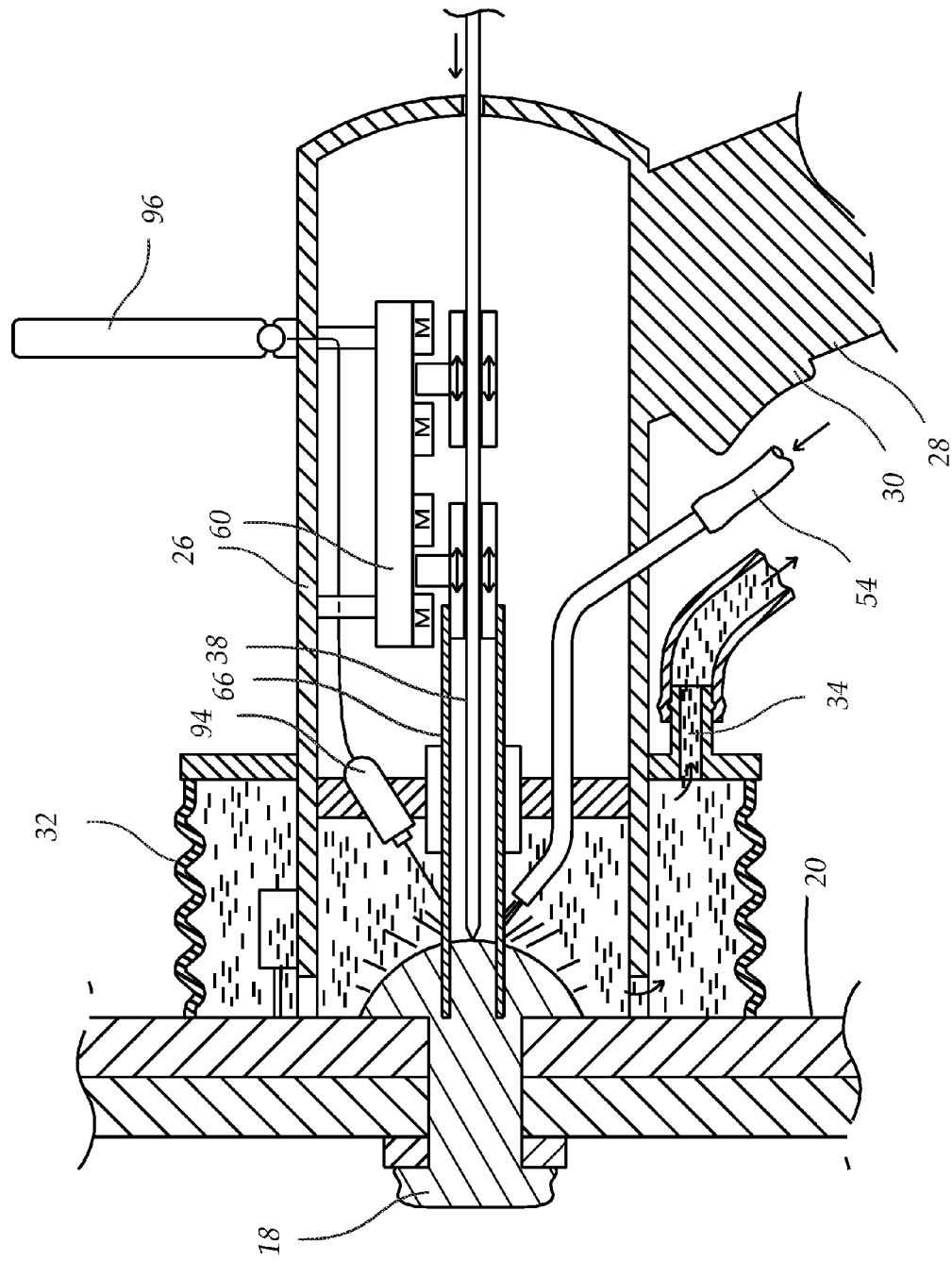

HAND-HELD ELECTRO-DISCHARGE DEVICE

RELATED APPLICATION

This application claims the full Paris Convention benefit of and priority to U.S. Provisional Patent Application Ser. No. 61/196,806, filed Oct. 21, 2008, the contents of which are incorporated by reference herein in its entirety, as if fully set forth herein.

BACKGROUND

1. Field

This disclosure relates to electrical discharge machining (EDM).

2. General Background

Single-use fasteners, such as a rivet or aerospace fastener where the fastener is formed during the assembly process, is common in many industries. In aerospace, the maintenance of air frames frequently requires removal of hundreds of fasteners in order to replace or repair structural members such as longerons, bulkheads, center barrels, and the like. Fasteners commonly include rivets or threaded fasteners which have been malleably distorted so they cannot be directly removed. Many of these fasteners are manufactured in titanium or other difficult to machine materials.

For example, during assembly, an extended portion often referred to as a "shank" of a fastener extends through one or more frames and may be pulled with respect to a collar on the opposite side. When the appropriate tension in the fastener shank is achieved, the collar may be malleably crushed against the shank of the fastener to form a permanent structure. Removal of the fastener and collar from the frame(s) may be challenged due to the fixation of the fastener and the collar, the toughness of the materials used for fasteners and collar, and the delicate condition of surrounding frames to which they are applied.

Traditional methods which have been utilized for many years to remove such fasteners is to machine away the head of the fastener with a drill which is manually positioned. The drill adds pressure to the region being drilled as well as heat. Additionally, when the fastener is of titanium or other difficult to machine materials, such drilling results in a significant consumption of drill bits. Traditional drilling of fasteners operation has a known risk of damage to the structure in which the fastener is engaged. Damage to surrounding structures may result from vibration, drill bit slips, or drilling too deep. If drill bit slippage damage occurs to the surrounding material, or if the hole should be cut too deep, an oversized fastener might be used during reassembly, or the entire component may need to be replaced. Measures to correct such undesirable damage may result in additional expense associated with the operation.

In some cases, safety regulations and guidelines indicate a maximum number of errors that can be diagnosed and treated before an entire portion of a workpiece must be abandoned and replaced. Some regulations and guidelines may also require inspections of areas which appear to have had drill damage to assess the proper corrective action, if any. Such diagnostics require time, may cause delay, and may result in costs.

Electric discharge machining, or EDM, is an established method and apparatus utilized for machining metal. It operates through the utilization of an electrical discharge to remove metal from the workpiece. In the EDM process, an electrode is brought into close proximity to the workpiece. High voltage is applied in pulses at high frequency. The process occurs in the presence of a dielectric fluid. This creates sparking at generally the closest position between the workpiece and the electrode. Particles are removed from the workpiece when sparking is quenched. The duration of the spark (on-time) and the recovery time (off-time) are controlled so that the workpiece and electrode temperatures are not raised to the temperature of bulk melting. Therefore, erosion is essentially limited to a vaporization process.

SUMMARY

According to some implementations, devices, systems, and methods of the present disclosure are directed to a hand-held electro-discharge machining fastener removal method and device. The hand-held EDM device provides the electrodes, a dielectric, dielectric containment, reconditioning, and fluid removal. The device is connected by a flexible umbilical to support equipment, which may include one or more of plasma power system, plasma controller, dielectric fluid pressurizing system, dielectric fluid delivery system, dielectric fluid drain system, dielectric fluid cleaning and deionization system.

The hand-held device may be taken to the workpiece versus traditional EDM in which the target item (workpiece) is taken to the EDM device.

In some exemplary implementations, the hand held EDM and system is capable of removing at least a portion of a fastener with little or no damage to the material in which the fastener is engaged.

In some exemplary implementations, the device may be utilized to remove parts of fastener structure that is already inserted into an assembled body, such as a frame, so that the fastener can be removed for disassembly of the body and surrounding structure.

In some exemplary implementations, the hand-held device may be connected to a service module which need not be hand-held but supplies the hand-held device at least one of power, flushing fluid, return pathways for spent flushing fluid, and power management to control the hand-held device.

The device may be brought to a workpiece and operated in such a manner as to remove a sufficient part of a fastener to permit the fastener to be removed from a frame or structure without damaging the structure of the frame.

According to some exemplary implementations, a hand-held EDM device is disclosed, comprising, in combination: a base; a hood attached to the base at a distal end of the base, the hood being configured to enclose a workspace when brought to a workpiece; an erosion electrode having a distal end disposed within the workspace and moveable relative to the base along an axis; a ground electrode having a distal end disposed within the workspace and moveable relative to the base along the axis, wherein the ground electrode is configured to contact at least a portion of the workpiece; a dielectric inlet configured to deliver a dielectric fluid to between the erosion electrode and the workpiece; a dielectric outlet configured to evacuate the dielectric fluid; wherein the hand-held EDM device is configured to be held by a user and brought to a workpiece. A handle or grip may be attached to the base.

According to some exemplary implementations, an EDM fastener removal device is disclosed comprising, in combination: a hood fixably attached to the base at a distal end of the base, the hood being configured to enclose a workspace between the hood and a frame with at least a portion of the fastener within the workspace; an erosion electrode having a hollow tubular shape and having a distal end disposed within the workspace and moveable relative to the fastener; a ground electrode having a distal end disposed within the workspace and configured to contact at least a portion of the workpiece; a dielectric inlet configured to deliver a dielectric fluid to between the erosion electrode and the workpiece; wherein the hollow tubular shape of the erosion electrode is configured to erode at least a portion of the fastener without eroding the frame.

According to some exemplary implementations, a method for removing a fastener from a frame is disclosed comprising, in combination: providing a hand-held EDM device having a hood, a ground electrode, and an erosion electrode; providing the hood to the frame, whereby a workspace is enclosed between the hood and the frame with at least a portion of the fastener within the workspace; contacting the fastener with the ground electrode; delivering a dielectric between the erosion electrode and the fastener; advancing the erosion electrode near the fastener; creating an electrical charge in the erosion electrode until a breakdown occurs in the dielectric fluid between the erosion electrode and the fastener, whereby a portion of the fastener is eroded into the dielectric fluid; and removing the dielectric containing the eroded portion of the fastener.

DRAWINGS

The above-mentioned features and objects of the present disclosure will become more apparent with reference to the following description taken in conjunction with the accompanying drawings wherein like reference numerals denote like elements and in which:

FIG. 4A shows a sectional view of a hand-held EDM device, shown in association with a fastener receiving a pilot hole;

FIG. 4B shows a sectional view of a hand-held EDM device, shown in association with a fastener having a pilot hole;

FIG. 5A shows a sectional view of a hand-held EDM device, shown during an erosion process and in association with a fastener to be removed;

DETAILED DESCRIPTION

Figure 1:
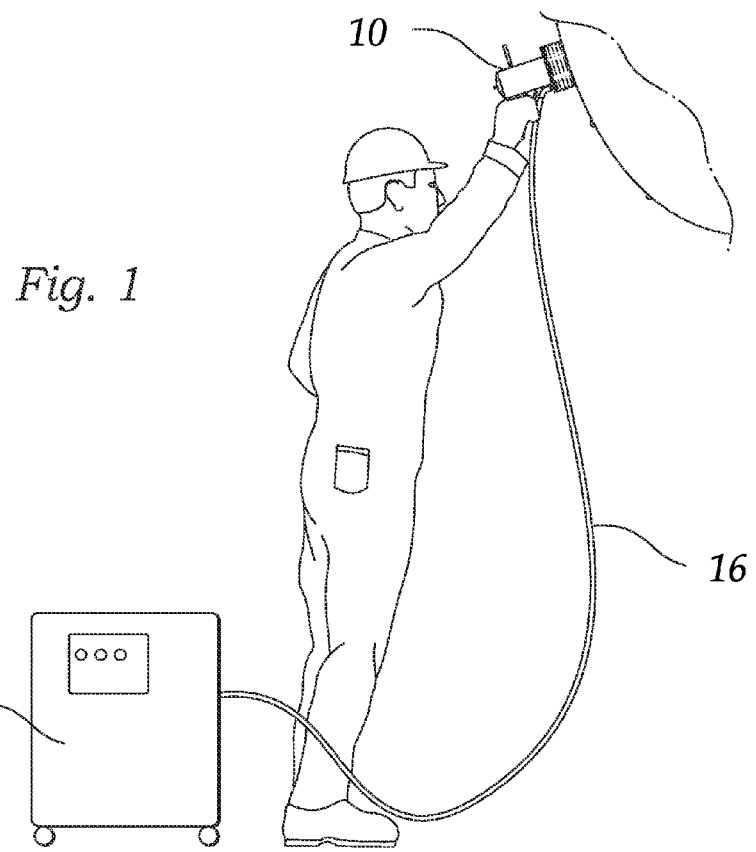
FIG. 1 shows a view of a workman applying a hand-held EDM device to a workpiece.

FIG. 1 shows the hand-held device 10 being hand-held by a user. In this implementation the hand-held device 10 is part of a system which supplies power, control and dielectric fluid (which may also be a coolant) via the support unit 14. Flexible umbilical 16 interconnects the hand-held device 10 and the support unit 14 so that the hand-held device can be positioned as desired.

Figure 2:
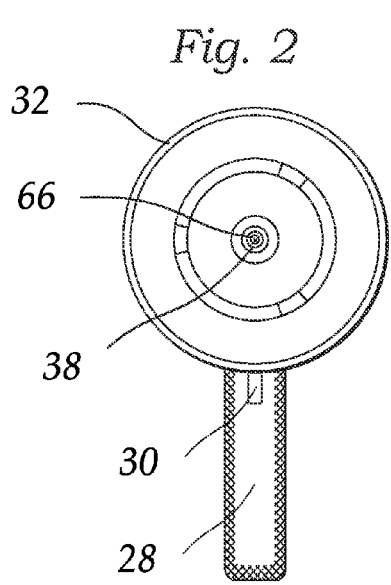
FIG. 2 shows a front view of a hand-held EDM device.
Figure 3:
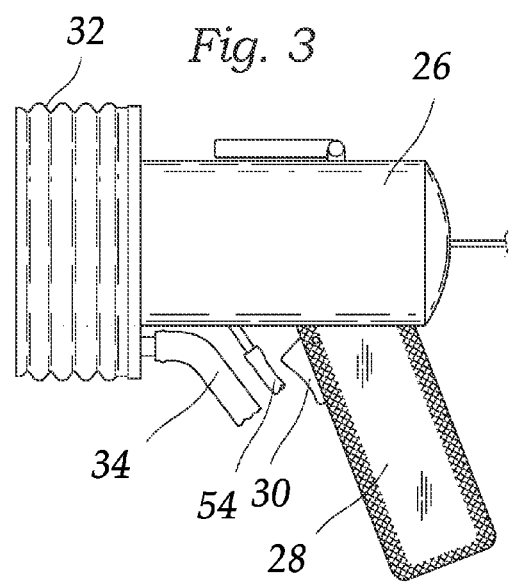
FIG. 3 shows a side view of a hand-held EDM device.

According to some exemplary implementations, a hand-held device 10 is shown in side elevational view in FIG. 2. According to some exemplary implementations, a side view is shown in FIG. 3.

As shown in the figures, a hand-held device 10 may be positioned to remove a fastener 18 which extends through one or more frames. As further shown in the figures, fastener 18 and fastener collar 24 secure one or more frames. As will be clear to those skilled in the art, any variety of fasteners and associated components may be the object upon which some exemplary implementations of the disclosed device and method may operate.

FIGS. 4A, 4B, 5A, 5B, 6A, 6B, and 6C shows a longitudinal section through a hand-held device 10 according to exemplary implementations. The principle structural reference part of the hand-held device 10 is the base 26. The base may be maneuvered by handle 28, which is secured thereto. The handle 28 may be configured to be held in the hand of the workman. Various configurations may be provided to provide hand-held operation of the device 10. According to some exemplary implementations, the handle 28 may carry a switch 30 to activate components of the hand-held device 10, as disclosed herein.

According to some exemplary implementations, mounted on a distal end of the base 26 is a hood 32. The hood 32 defines a workspace, within which erosion activity may occur. The hood 32 may be configured to seal against a portion of a workpiece, such as a frame, thereby enclosing the workspace such that the workspace includes access to at least a portion of a fastener 18, a collar 24, or another workpiece. The portion enclosed may be at least one of the shank of fastener 18, the head of fastener 18, and the collar 24. According to some exemplary implementations, as the hood 32 engages the workpiece, the hood 32 may be configured to enclose the workspace so as to substantially isolate it from the environment outside the workspace. Accordingly, substances within the workspace may be contained except through controlled inlets and outlets, as disclosed herein. For example, at least a portion of the hood 32 may be of a flexible or deformable material that adaptably interfaces with the surface 20 of the workpiece to create a seal at the interface. There may be provided a rigid structure for stabilizing the hand-held device 10 against a workpiece, such as at the surface 20, as shown in the figures. Channels may be provided for passage of dielectric fluid there through.

According to some exemplary implementations, hand-held device 10 may include a ground electrode 38 and erosion electrode 66. The erosion electrode 66 may be configured to controllably approach a portion of a workpiece to be eroded, such as a fastener 18 or a collar 24.

A variety of electrode shapes, geometries, and morphologies may be provided for the erosion electrode 66. Electrode morphologies may be selected according to desired usage (i.e. erosion results and application specific variables).

Figure 5B:
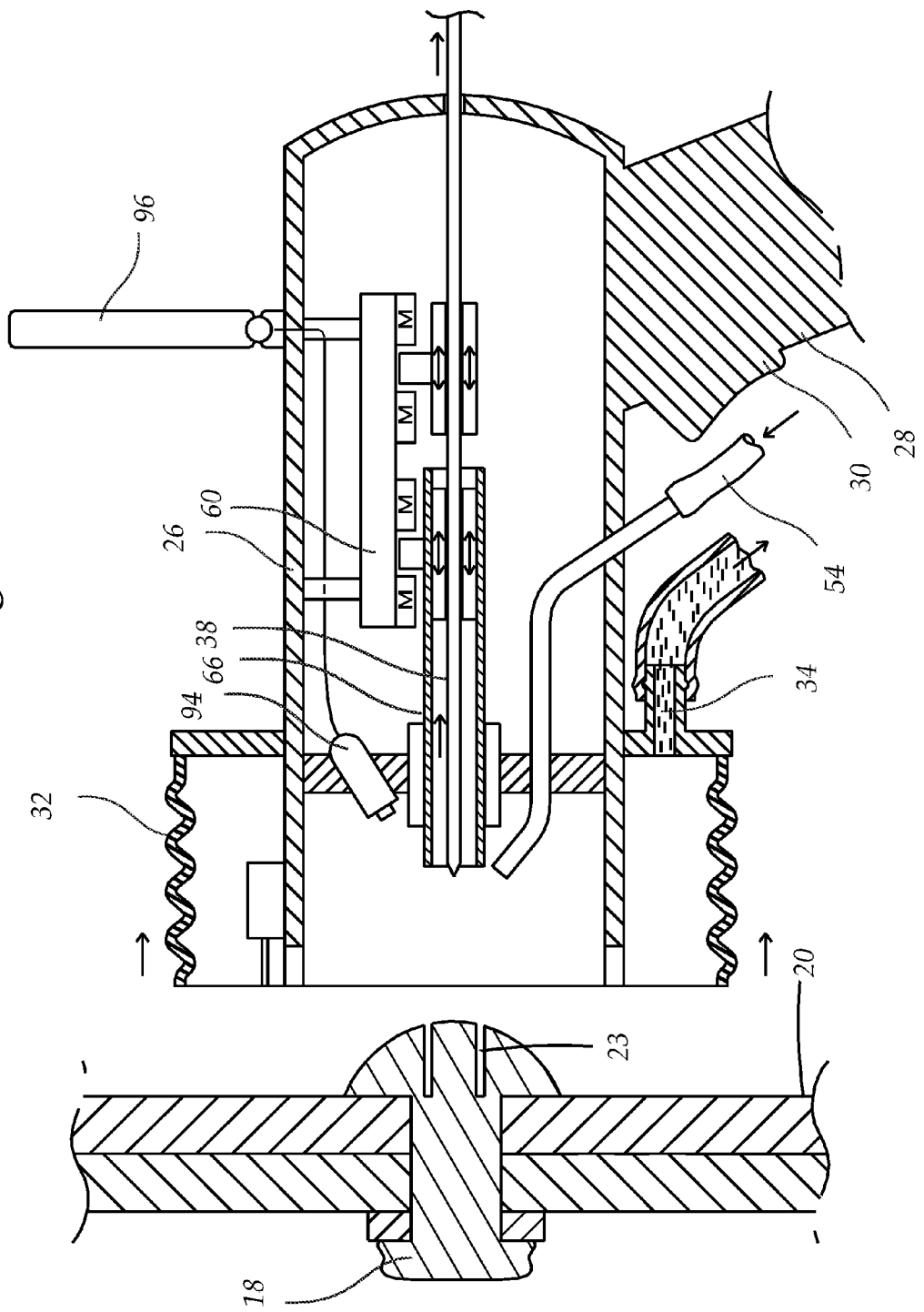
FIG. 5B shows a sectional view of a hand-held EDM device, shown after an erosion process in association with a fastener to be removed.
Figure 6A:
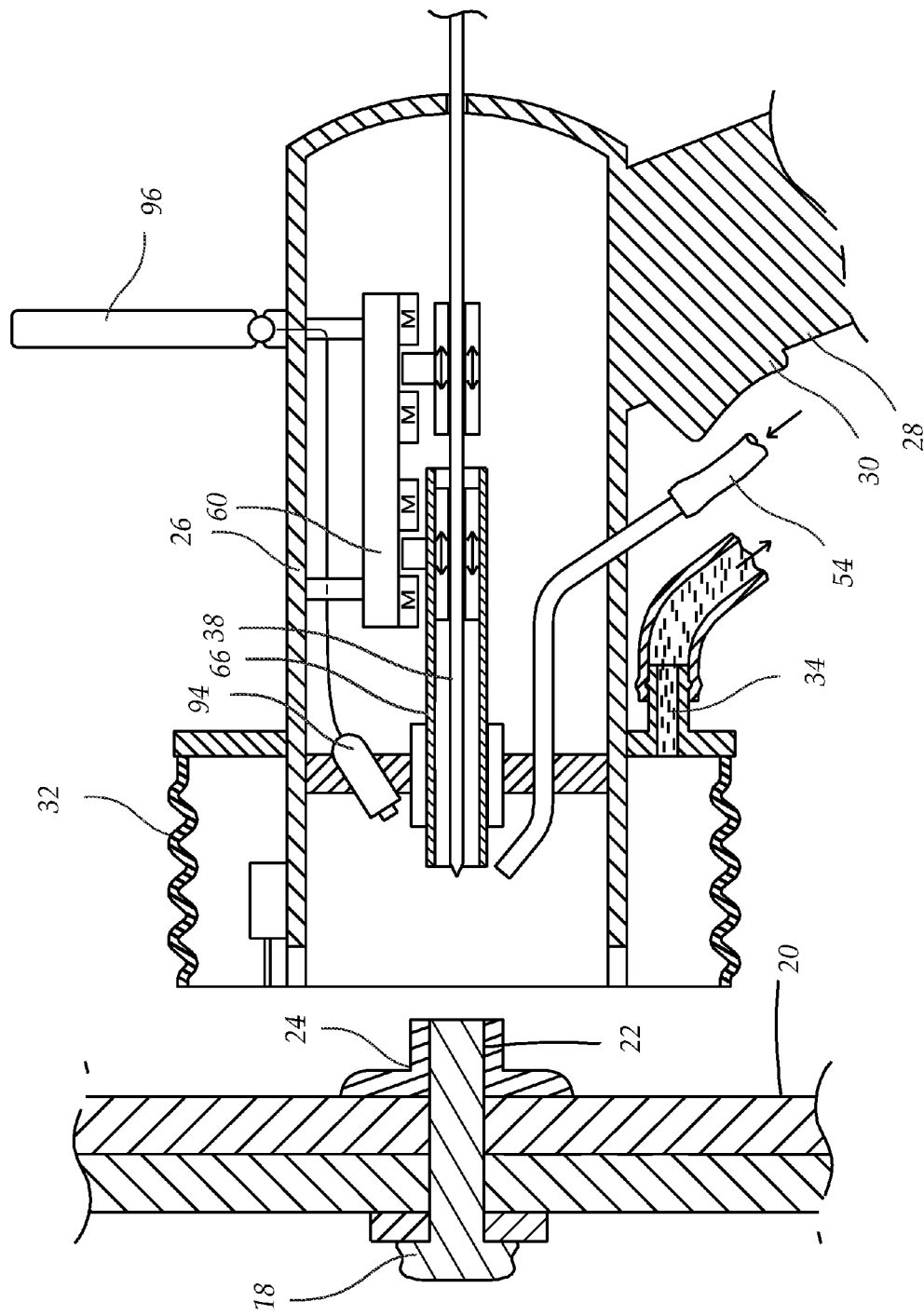
FIG. 6A shows a sectional view of a hand-held EDM device, shown prior to an erosion process and in association with a fastener and collar to be separated.
Figure 6B:
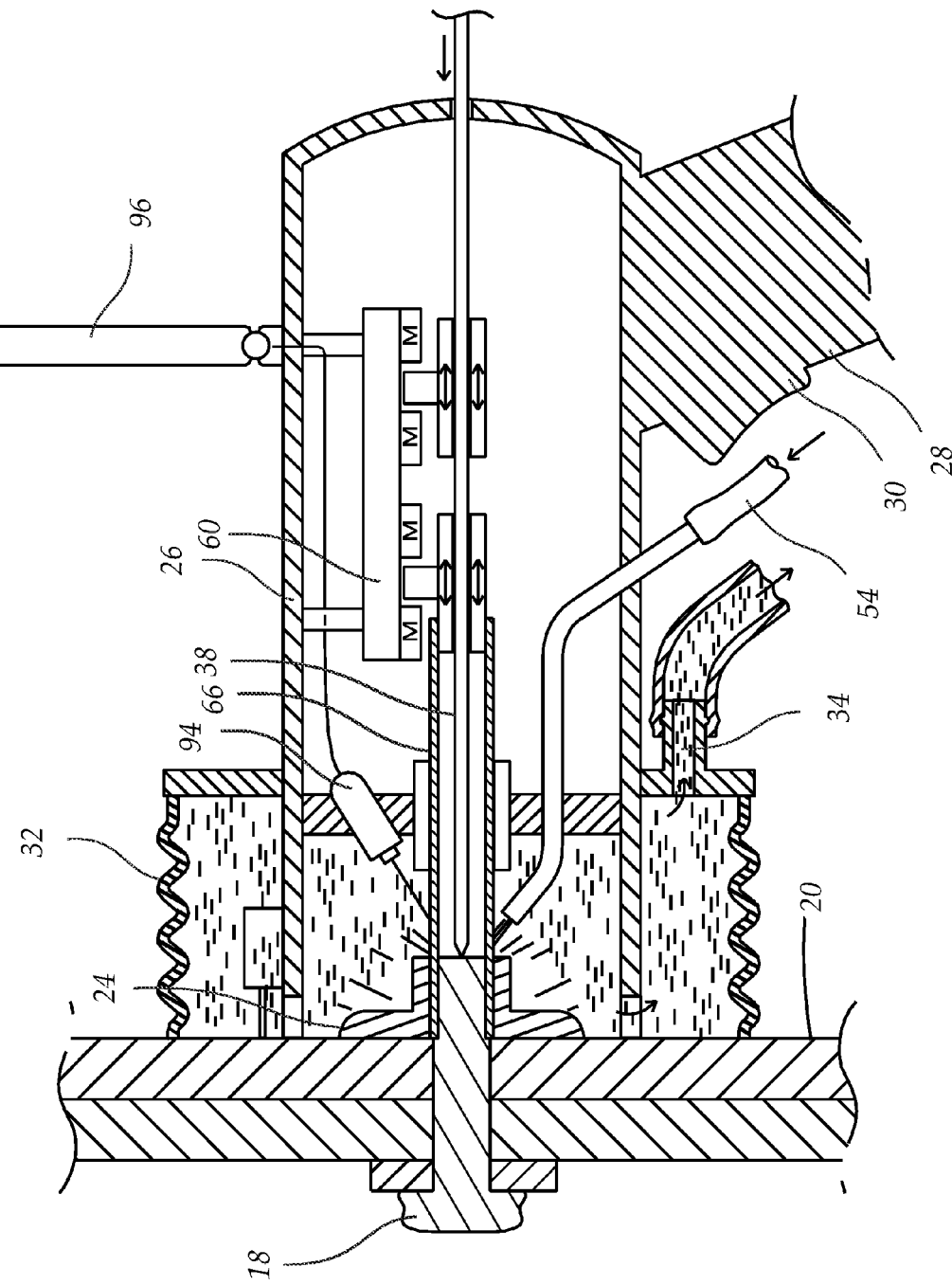
FIG. 6B shows a sectional view of a hand-held EDM device, shown during an erosion process and in association with a fastener and collar to be separated.
Figure 6C:
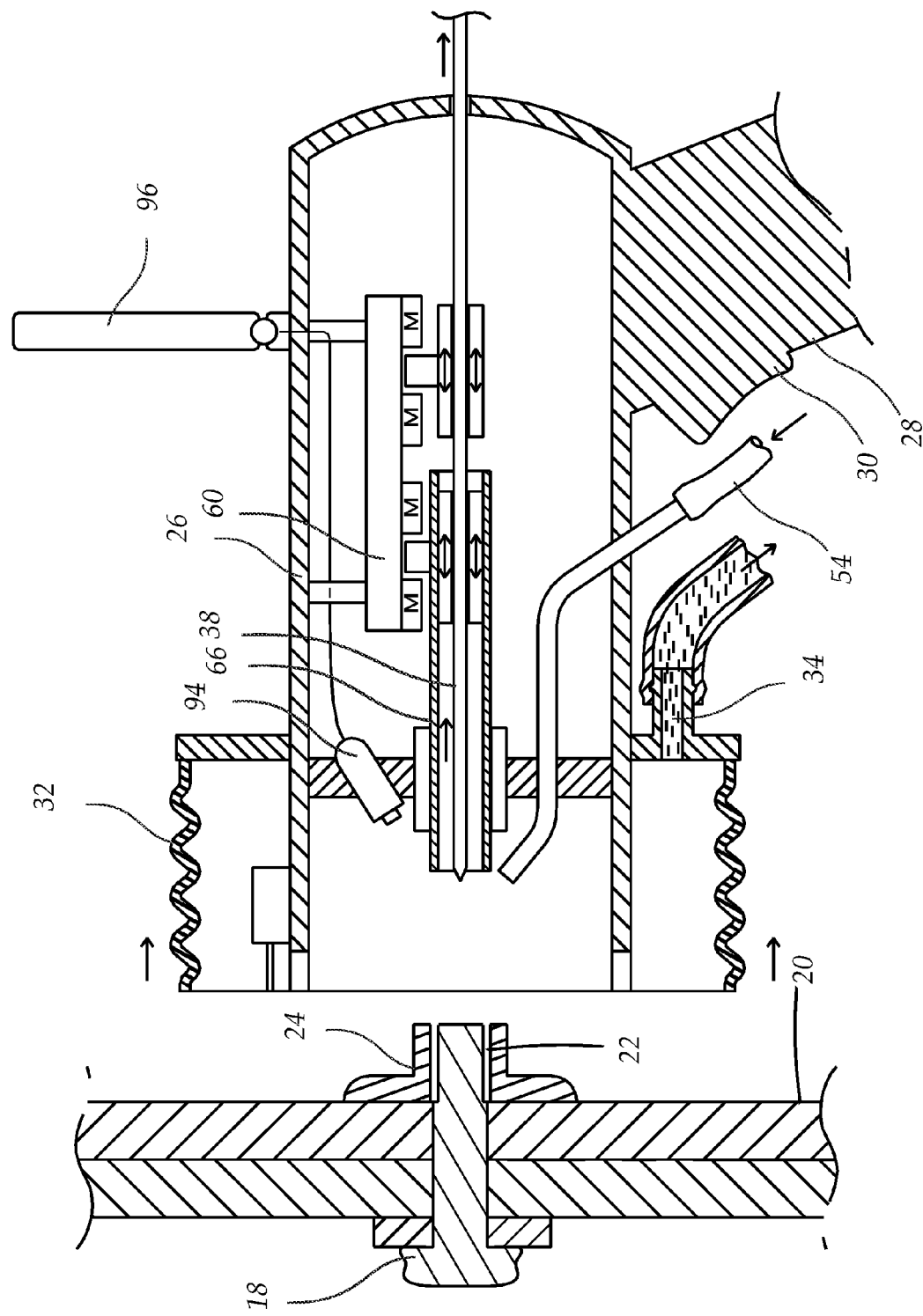
FIG. 6C shows a sectional view of a hand-held EDM device, shown after an erosion process and in association with a fastener and collar to be separated.
Figure 7:
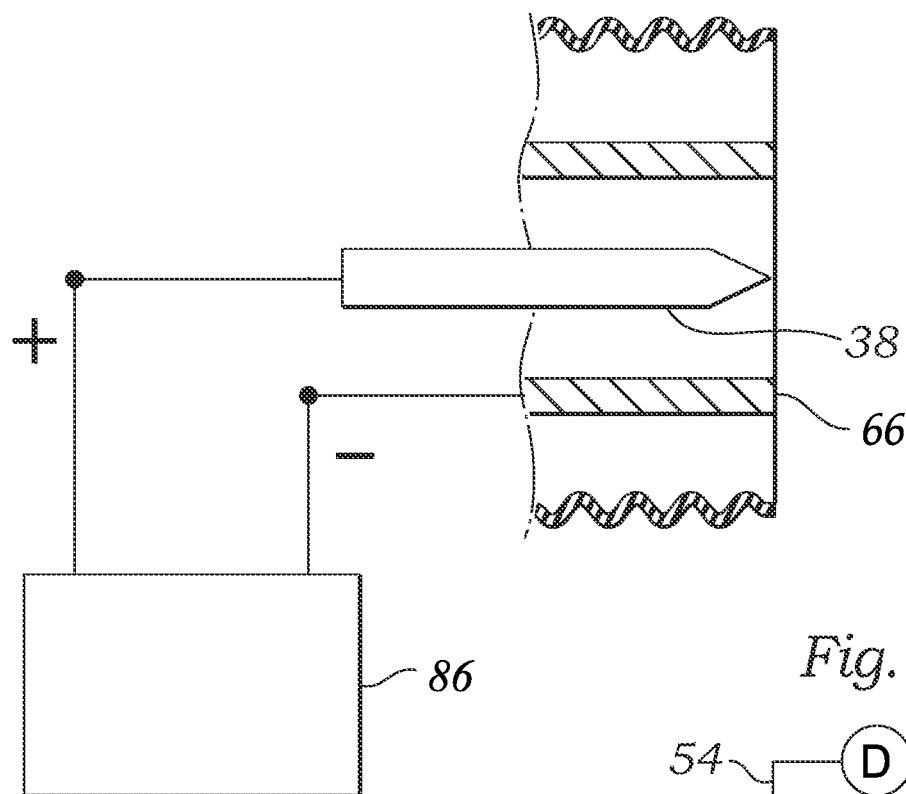
FIG. 7 shows a schematic electrical diagram of an plasma power system and components of a hand-held EDM device.

According to other exemplary implementations, aspects of which are shown in FIGS. 5A, 5B, 6A, 6B, and 6C, the erosion electrode 66 may be a hollow tubular structure. In some instances aspects of one exemplary implementation may fit properly into another exemplary implementation. The hollow tubular structure of an erosion electrode 66 may be symmetrical about an axis and configured to travel longitudinally along the axis, thereby eroding a ring-shaped portion of the workpiece. This shape is useful for separating the head flange of a fastener 18 from the shank of the fastener 18 (as shown in FIGS. 5A and 5B) or for eroding the interface 22 between the shank of a fastener 18 and a collar 24 (as shown in FIGS. 6A, 6B, and 6C). Where erosion of the frame is not desired, such erosion may be minimized or avoided by providing a hollow tubular erosion electrode 66 having an outer diameter that is about equal to or less than the outer diameter of the shank of the fastener 18 or the inner diameter of the hole of the frame.

According to some exemplary implementations, an erosion electrode 66 having a hollow tubular structure may be further configured to rotate about its axis of symmetry as it advances longitudinally along the axis. The rotation of the hollow tubular structure helps reduce issues associated with uneven wear of the erosion electrode 66 at its distal end. An uneven electrode results in correspondingly uneven workpiece erosion. This corresponding erosion causes the uneven portions of the erosion electrode 66 to remain uneven, because the gap distance between the erosion electrode 66 and the workpiece (the spark gap) at each point is equal. When the device is applied to the next fastener, the uneven erosion electrode 66 will be attenuated since the "high" portions of the erosion electrode 66 will contact first, but will not be completely eliminated for multiple cycles. A rotating electrode will recover sooner than a non-rotating electrode. As the hollow tubular structure is rotated as it advances, the orientation of the uneven surface of the erosion electrode 66 is altered with respect to the correspondingly uneven workpiece. The changing relative orientation causes portions of the erosion electrode 66 that may have disproportionately greater extension to be moved into other locations of which may result in increased erosion activity, whereby the continued wear of the erosion electrode 66 is in some circumstances at least partially self-correcting in terms of providing an even erosion electrode 66 and an evenly eroded workpiece.

According to some exemplary implementations, the erosion electrode 66 may be moved by translational motion and rotational motion. According to some exemplary implementations, the translational motion of the erosion electrode 66 may simultaneously create rotational motion. for example, a lead screw may be rotated to advance the erosion electrode 66 and simultaneously rotate it about an axis. According to some exemplary implementations, translational and rotational motion of the erosion electrode 66 may be applied independently, such that rotation and translation may be simultaneously or separately provided.

According to some exemplary implementations, an erosion electrode 66 may be a solid pin configured to penetrate a fastener 18 as shown in FIGS. 4A and 4B. This shape is useful for providing a pilot hole in the fastener 18 for subsequent mechanical drilling. Such pilot holes help control operation of a mechanical drill by providing a non-slip location. This shape electrode is also useful for eroding a central portion of a head of the fastener 18 to allow removal of the flange from the shank (not shown). The pilot hole may be of any shape and cross-section (for example square or triangular) and may be used to extract a threaded fastener where a previous rotating method has been damaged or otherwise rendered ineffective.

According to some exemplary implementations, an erosion electrode 66 may include a plurality of pointed electrode tips (not shown). The electrodes tips may be distributed equidistant from an axis and configured to rotate about the axis as they advance longitudinally along the axis. The resulting erosion of the workpiece is ring-shaped, similar to that resulting from the operation of a hollow tubular structure. According to some exemplary implementations, separate plasma control systems 86 may be provided for each of the plurality of pointed electrode tips. Structure such as brushes may be provided to allow each of the pointed electrode tips to be charged by the corresponding plasma control systems 86 as it rotates about the axis. A plurality of power sources reduce the cycle time by enabling multiple simultaneous material erosion locations.

Figure 11A:
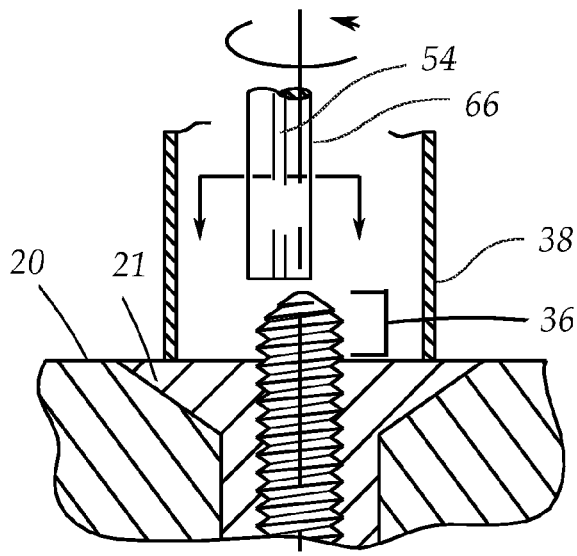
FIG. 11A shows an erosion electrode near a protrusion.
Figure 11B:
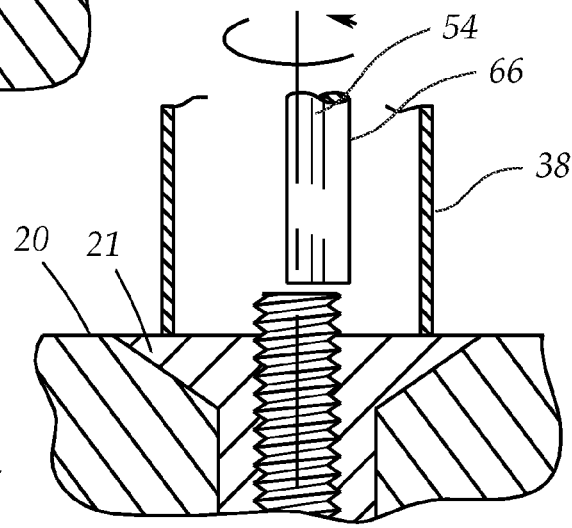
FIG. 11B shows an erosion electrode eroding a protrusion.
Figure 11C:
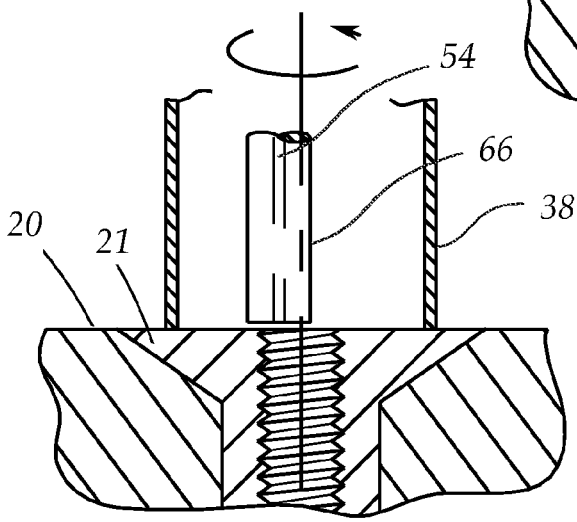
FIG. 11C shows an eroded protrusion.
Figure 11D:
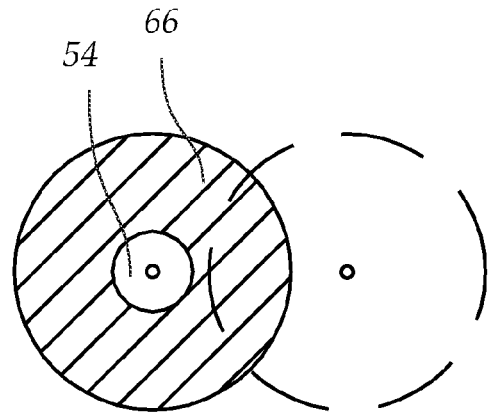
FIG. 11D shows a sectional view of an erosion electrode and axis of rotation.

According to some exemplary implementations, an erosion electrode 66 may be configured to erode and reduce a nub, burr, raised portion, or protrusion 36, such as an end of a fastener threaded through a frame 21 and extending from a surface 20, as shown in FIG. 11A. An erosion electrode 66 may be configured to target the protrusion 36 to bring it closer to even with the surface 20 from which it extends, as shown in FIG. 11C. For example, the erosion electrode 66 may have a substantially flat tip facing the surface 20 from which the protrusion 36 extends, as shown in FIG. 11A. As the erosion electrode 66 advances toward the workpiece, the protrusion 36 is eroded, as shown in FIGS. 11B and 11C. Further, a ground electrode 38 may be provided to complete a circuit across the spark gap between the erosion electrode 66 and the protrusion 36. The ground electrode 38 may be in contact with a portion of the protrusion 36 (not shown) or another portion of the workpiece that is in electrical conduction with the protrusion 36, such as a frame 21.

According to some exemplary implementations, an erosion electrode 66 approaching an uneven workpiece, such as a protrusion 36, may tend to experience its own erosion. In such a situation, the portion of the erosion electrode 66 that is eroded corresponds to the portion at which plasma events are occurring, which is generally the portion closest to the workpiece. In the case of eroding a protrusion 36, the wear on the erosion electrode 66 would be uneven, rendering the erosion electrode 66 unable to evenly reduce the protrusion 36 level with the surface 20 from which it extends because the tip of the erosion electrode 66 facing the workpiece surface 20 would no longer be flat. To reduce uneven wear on the erosion electrode 66, the position of the erosion electrode 66 relative to the protrusion 36 may be altered during the process such that the locations of plasma events are distributed across the erosion electrode 66. For example, the erosion electrode 66 may be rotated as it advances toward the protrusion. According to some exemplary implementations, the erosion electrode 66 may be rotated about an axis that passes through a portion of the protrusion 36 but does not pass through the center of the erosion electrode 66, as shown in FIGS. 11A, 11B, 11C, and 11D. The result is that any given exposed portion of the protrusion 36 is acted upon by different portions of the erosion electrode 66 during rotation of the erosion electrode 66. For example, a right side of the erosion electrode 66 is shown aligned with the center of the protrusion 36 in FIG. 11A, and a left side of the erosion electrode 66 is shown aligned with the center of the protrusion 36 in FIG. 11B. According to some exemplary implementations, other types of rotation may be applied or combined to distribute wear on the erosion electrode 66, such as rotation about a central axis of the erosion electrode 66.

According to some exemplary implementations, the erosion electrode 66 may be provided with a dielectric inlet 54 provided by one or multiple a channels within and extending along the erosion electrode 66, as shown in FIGS. 11A, 11B, 11C, and 11D. Such a configuration allows dielectric fluid to be provided directly to the location of plasma events in the spark gap. A dielectric outlet 34 may be provided in fluid communication with the workspace.

According to some exemplary implementations, configurations shown in FIGS. 11A, 11B, 11C, and 11D and disclosed herein may be used to erode beyond the outer surface 20 of a workpiece (not shown). In such instances a countersink, recess, well, or divot will result.

According to some exemplary implementations, components may be provided to effectuate the advancement and retraction of erosion electrode 66 relative to the base 26 or the workpiece. According to some exemplary implementations, a motor 60 may be provided to affect the position of the erosion electrode 66 relative to the base 26 or the workpiece. For example, the motor 60 may be a linear motor or any motor adapted to effect linear motion. For example, a stepper motor may be used for the motor 60. When the hand-held device 10 is provided to a workpiece, the position of the erosion electrode 66 relative to the base 26 may correspond to the position of the erosion electrode 66 to the workpiece.

According to some exemplary implementations, a ground electrode 38 may be configured to contact at least a portion of the workpiece that is electrically conductive with another portion of the workpiece that is eroded by the erosion electrode 66. For example, where portions of the head, flange, or shank of fastener 18 are to be eroded, the ground electrode 38 may be configured to contact a portion of the fastener 18, such that a dielectric breakdown between the erosion electrode 66 and the fastener 18 may be achieved.

According to some exemplary implementations, a ground electrode 38 may be any conductive structure configured to complete an electrical circuit when placed in electrical conduction with an erosion electrode 66. For example, a ground electrode 38 may act as a "floating ground." A ground electrode 38 may have an applied charge that is in contrast to the charge applied to the erosion electrode 66, whether or not the ground electrode 38 provides a zero voltage reference point. Alternatively, a ground electrode 38 may be connected to "Earth ground," such that any charge from the erosion electrode 66 is drawn to the ground electrode 38.

According to some exemplary implementations, a ground electrode 38 may be disposed central to and concentric with a tubular erosion electrode 66, as shown in FIGS. 5A, 5B, 6A, 6B, and 6C. According to some exemplary implementations, a ground electrode 38 may be a hollow tubular structure having an erosion electrode 66 disposed therein, as shown in FIGS. 4A and 4B.

Where conduction of electricity through the frames is not desired or required, electrical conductivity through the frames may be avoided by maintaining the ground electrode 38 in contact with the workpiece that is being eroded. For example, electrical charge may travel through from the erosion electrode 66 through the dielectric fluid to the fastener 18. From there, it may travel directly to the ground electrode 38 rather than through the frame. Coatings provided on the fastener 18, the collar 24, or the frames and other factors at the interfaces between these components may further inhibit inter-component conductivity. Thereby, electrical activity in the frame or other undesired portions may be avoided, as well as other associated collateral issues.

According to some exemplary implementations, and as shown in FIGS. 5A, 5B, 6A, 6B, and 6C, the ground electrode 38 may be disposed concentrically within a hollow tubular structure of an erosion electrode 66 and configured to contact a central portion of the fastener 18 concentric with the erosion activity effectuated by the erosion electrode 66.

Figure 9:
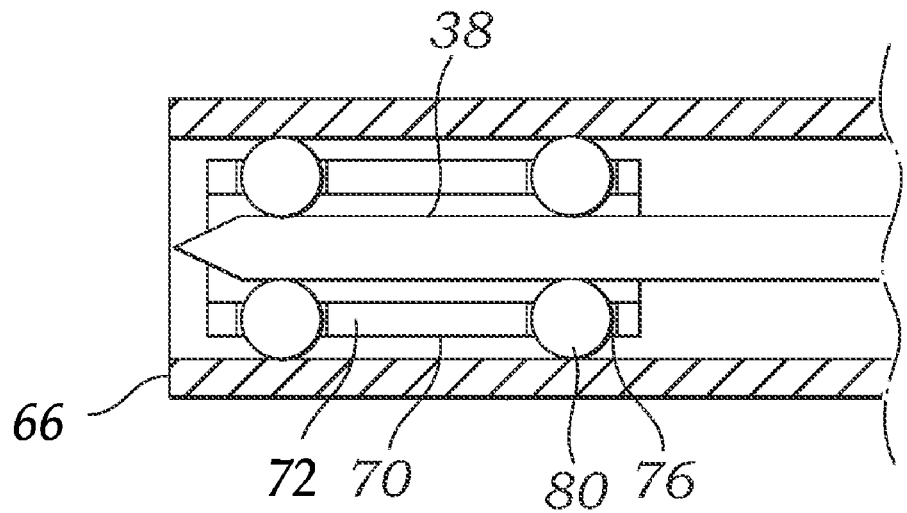
FIG. 9 shows a longitudinal section through a ground pin guide in a forward part of a hand-held EDM device.

According to some exemplary implementations, to maintain this concentricity, a guide structure 70 may be provided, as shown in FIG. 9. A guide tube 72 is provided and is of an insulating material to serve as a buffer between the ground electrode 38 and the erosion electrode 66. Insulating bearings 80 may be provided within openings 76 along the guide tube 72. The bearings 80 maintain an insulating separation between the ground electrode 38 and the erosion electrode 66 and facilitate relative longitudinal motion between the ground electrode 38 and the erosion electrode 66. This configuration may be provided so as to maintain fluid communication for the dielectric fluid flow across the guide structure 70.

According to some exemplary implementations, a dielectric inlet 54 and dielectric outlet 34 are provided in fluid communication with the workspace defined by the hood 32. According to some exemplary implementations, dielectric fluid may be provided to the workspace or the gap between the erosion electrode 66 and the workpiece by a variety of structures and methods. For example, the dielectric inlet 54 may provide targeted, high-velocity flow of the dielectric fluid directed to the spark gap between the erosion electrode 66 and the workpiece.

According to some exemplary implementations, a dielectric inlet 54 is configured to provide a dielectric fluid to the gap between the erosion electrode 66 and the workpiece. According to some exemplary implementations, the dielectric inlet 54 may provide dielectric fluid along at least a portion of the erosion electrode 66 such that the dielectric fluid is delivered directly to the location of plasma events occurring at the end of the erosion electrode 66. For example, where the erosion electrode 66 is a hollow tubular structure, the dielectric inlet 54 may provide the dielectric fluid within the hollow tubular structure, such that the dielectric fluid is drawn through the spark gap to reach a dielectric outlet 34 located outside the hollow tubular structure. Where the erosion electrode 66 is disposed within a hollow tubular structure, the dielectric inlet 54 may likewise provide the dielectric fluid within the hollow tubular structure to the spark gap. Those of ordinary skill in the art will recognize that the coolant fluid may in some instances be the dielectric fluid. In other cases, a dielectric fluid and a coolant fluid may be provided in sequence. For example, a coolant fluid may be provided after an erosion process has been completed.

According to some exemplary implementations, a dielectric outlet 34 may be provided and configured to evacuate the dielectric fluid and other debris from the workspace. The dielectric outlet 34 may evacuate the dielectric fluid and other debris through a directed channel of flow, such as where the spark gap is disposed between the dielectric inlet 54 and the dielectric outlet 34. According to some exemplary implementations, the dielectric outlet 34 may evacuate the dielectric fluid generally from the workspace defined by the hood 32, wherein turbulence within the workspace provides opportunities for the dielectric fluid and other debris to be removed through the dielectric outlet 34.

Figure 8:
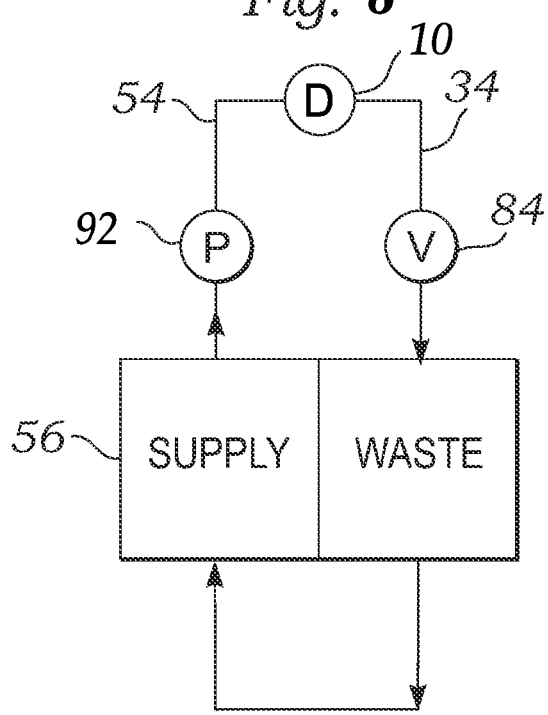
FIG. 8 shows a schematic diagram of the dielectric supply and waste systems.

According to some exemplary implementations, the flow of dielectric fluid may be facilitated by at least one of an inlet pump 92 connected to the dielectric inlet 54 and a drain pump 84 connected to the dielectric outlet 34, as shown in FIG. 8. The inlet pump 92 may increase the velocity with which the dielectric fluid travels through the spark gap by applying a high pressure to the dielectric inlet 54. The drain pump 84 may further increase the velocity with which the dielectric fluid travels through the spark gap by applying a low pressure to the dielectric outlet 34. According to some exemplary implementations, the combination of an inlet pump 92 and a drain pump 84 provide high speed flushing of the spark gap, resulting in faster evacuation of debris that may otherwise adversely affect the performance of the erosion electrode 66. For example, pressure provided by the inlet pump 92 in the range of up to about 80 PSI provides improved erosion performance. Pressure below 80 PSI were shown to increase the time required to achieved erosion targets (cycle time). For example, a pressure of 60 PSI approximately doubled cycle times for some workpiece materials. Pressure may be provided up to levels that allow a seal with the workpiece to be maintained under operator forces/pressures such that the dielectric fluid is substantially contained within the workspace enclosed by a hood 32 while a user operates the hand-held device 10.

According to some exemplary implementations, the dielectric fluid provides the channel through which plasma events occur. For example, a sufficient voltage difference across the spark gap between the erosion electrode 66 and the workpiece may cause breakdown of the dielectric fluid and electrical conduction through the plasma that is formed thereby. The dielectric fluid may be of de-ionized water, oil, or other appropriate substances that are generally non-conductive.

According to some exemplary implementations, the dielectric outlet 34 may evacuate debris removed from the workpiece during operation of the hand-held device 10. The presence of debris between the erosion electrode 66 and the workpiece may adversely affect the operation of the hand-held device 10 by altering the nature of the materials in the gap. Because the workpiece debris may be generally conductive material, its presence in the dielectric fluid may alter the environment of the fluid as a dielectric. Large enough debris may provide a conductive bridge across the gap that prevents breakdown of the dielectric fluid and plasma formation. Thus, the dielectric fluid may be provided with high flow rate to facilitate flushing of the debris.

According to some exemplary implementations, the dielectric fluid may provide cooling for the components involved in the operation of hand-held device 10. For example, the high energy states of plasma events occurring in the gap between the erosion electrode 66 and the workpiece may tend to heat the electrodes and/or workpiece. However, the cooling effect provided by the dielectric fluid may maintain the electrodes and/or workpiece at a temperature that improves safety and efficiency to the user. For example, after operation of the hand-held device 10, the electrodes and/or workpiece may be immediately operated upon by a user without the danger of residual high temperatures in the workpiece.

According to some exemplary implementations, the dielectric inlet 54 and the dielectric outlet 34 may be parts of a closed loop system that recycles dielectric fluid and isolates workpiece debris, as shown in FIG. 8. For example, the dielectric inlet 54 may deliver the dielectric fluid from a dielectric supply tank 56 to the workspace; the dielectric fluid and debris may be evacuated from the workspace through the dielectric outlet 34 to a debris extraction zone, where the debris may be separated from the dielectric fluid; and the dielectric fluid is returned to the dielectric inlet 54. If de-ionized water is used as a dielectric fluid, the system may include a subsystem that re-establishes the de-ionized character of the dielectric fluid.

According to some exemplary implementations, the debris separation zone may be within the hand-held device 10 or outside the hand-held device 10 to provide a more compact hand-held portion. For example, the dielectric inlet 54 and the dielectric outlet 34 may connect to the umbilical 16 to provide fluid communication to and from the support unit 14, where the debris separation zone may be located. The debris separation zone may include a filter, sediment deposition portion, or other features to separate the debris from the dielectric fluid. For example, in a sediment deposition, the debris-laden dielectric fluid may be provided to a tank with low flow rate, giving the debris—having higher density than the dielectric fluid—an opportunity to collect at the bottom of the tank. The dielectric fluid may be taken from the portion above the collected debris and recycled to the dielectric inlet 54.

According to some exemplary implementations, the flow of dielectric fluid to the workspace may be controlled so as to occur when an appropriate seal is formed at the interface of the hood 32 and the workpiece. For example, the flow of dielectric fluid may be activated by the switch 30 operated by a user or other events that correspond to a time when the hand-held device 10 is prepared to flow the dielectric fluid.

Figure 10:
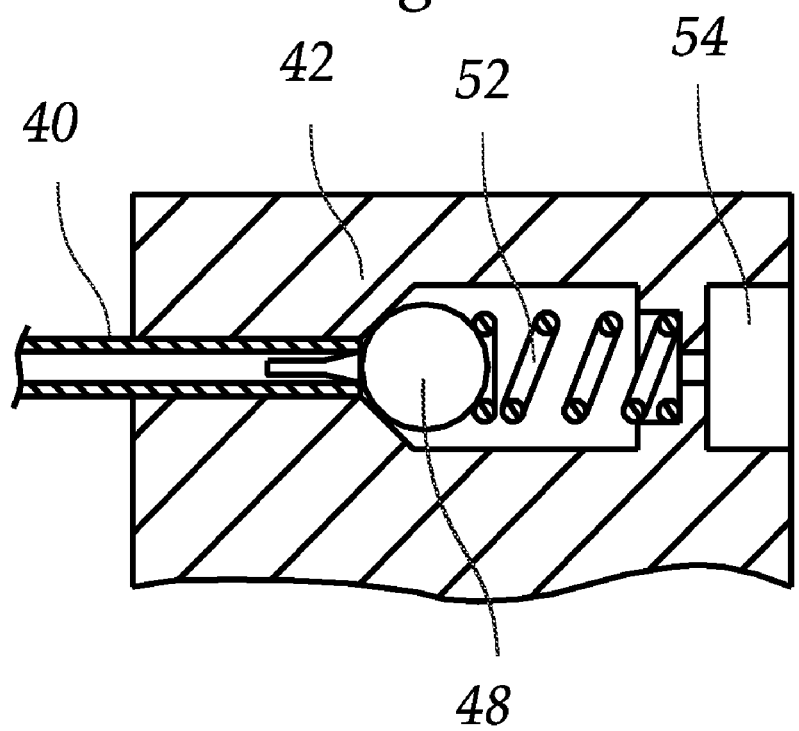
FIG. 10 shows components of a hand-held EDM device configured to dispense dielectric fluid.

According to some exemplary implementations, the application of the ground electrode 38 against the workpiece may enable the flow of dielectric fluid. For example, the ground electrode 38 may be mounted to a ground tube 40 in fluid connection with the workspace. The ground tube 40 may be slideably disposed within a valve block 42, as shown in FIG. 10. In an unactuated position, the ground tube 40 rests against valve ball 48, which is resiliently held against the valve block 42 by valve compression spring 52, thereby restricting flow of the dielectric fluid from the dielectric inlet 54. When the ground electrode 38 is pressed against the workpiece, the ground electrode 38 and the ground tube 40 cause the valve ball 48 to slide away from the valve block 42, thereby permitting flow from the dielectric inlet 54 to the workspace. Accordingly, when the ground electrode 38 is removed from the workpiece, the spring 52 causes the valve ball 48 to restrict flow of the dielectric fluid. Further, the configuration may automatically limit flow of the dielectric fluid if the portion of the workpiece contacted by the ground electrode 38 is removed, such as if a shank of a fastener were to slip out of the workspace. Thus, flow of the dielectric fluid may be automated based on the status of the ground electrode 38.

According to some exemplary implementations, devices and methods for providing visual observation of the workspace during operation of the hand-held device 10 are disclosed. According to some exemplary implementations, an image sensor 94 is provided at or near the workspace enclosed by the hood 32. For example, the image sensor may include a charge-coupled device (CCD), a complementary metal-oxide-semiconductor (CMOS), another active-pixel sensor, or another device configured to capture images such as digital images. The image sensor 94 is configured capture an image or series of images corresponding to the interface between the hand-held device 10 and the workpiece. For example, the image sensor 94 may capture images of a fastener 18 including a projected point of contact with at least one of the ground electrode 38 and the erosion electrode 66. The image sensor 94 may be connected to an aiming display 96 configured to provide a display of the image captured by the image sensor 94. For example, a portion of the aiming display may be known to correspond to a location at which the ground electrode 38 or the erosion electrode 66 would contact the workpiece. Accordingly, a user may properly position and orient components of the hand-held device 10 relative to the workpiece based on the visualization provided by the image sensor 94 and aiming display 96.

According to some exemplary implementations, a power supply 86 may provide electrical power to the hand-held device 10 during operation. The power supply 86 may be located within the support unit 14 in connection with the hand-held device 10, or the power supply 86 may be located onboard the hand-held device 10. The power supply 86 may provide power for operation of the motor 60, the image sensor 94, the aiming display 96, the inlet pump 92, the drain pump 84, the erosion electrode 66, or any other components operable with electrical power.

According to some exemplary implementations, methods of operating a hand-held device 10 and removing fasteners 18 are disclosed herein. In use, a user brings the hand-held device 10 to a workpiece. The workpiece may include at least one of a fastener 18, a collar 24, and a protrusion. For example, the hand-held device may be brought to the head of a fastener 18, the shank of a fastener 18, or a collar 24.

Figure 12:
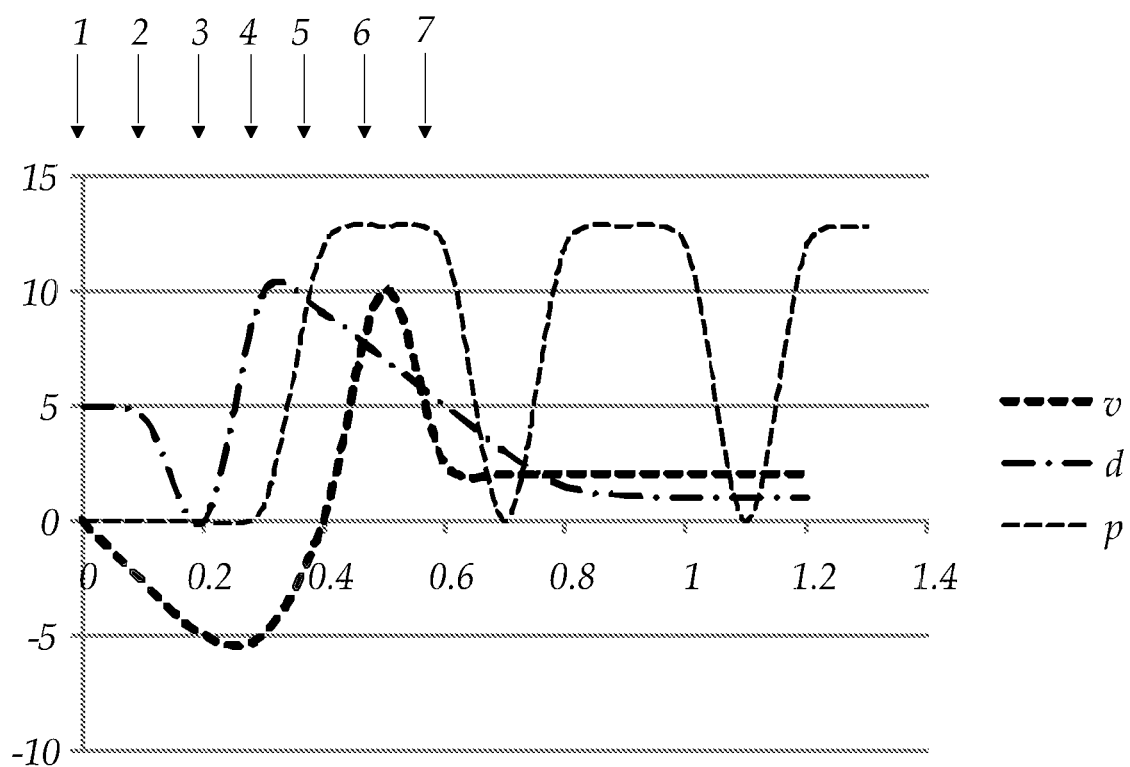
FIG. 12 shows a graph of measurements taken during an exemplary startup process of a hand-held EDM device.

The relationships between the dielectric pressure (near the end of the electrode) ("v"), the size of the spark gap ("d"), and the erosion power ("p") across time during an exemplary implementation of a startup process are represented in the chart of FIG. 12.

According to some exemplary implementations, the user engages the hood 32 onto a portion of the workpiece to create and maintain a seal enclosing a workspace. The drain pump 84 may cause a negative or relatively lower pressure to be created in the workspace to facilitate engagement of the hood 32 onto the workpiece. The negative or relatively lower pressure may also facilitate introduction of the dielectric fluid from the dielectric inlet 54. This operation is demonstrated starting at point 1 in FIG. 12.

According to some exemplary implementations, the handheld device 10 is centered onto the workpiece. The centering may correspond to the location of the erosion electrode 66 or the ground electrode 38 relative to the workpiece to be eroded. For example, location of the hand-held device may determine the targeted path that the erosion electrode 66 will travel. A user may use the view captured by the image sensor 94 and shown on the aiming display 96 to position the handheld device 10 relative to the workpiece.

According to some exemplary implementations, the erosion electrode 66 is brought into contact with the portion of the workpiece to be eroded; the ground electrode 38 is brought into contact with a portion of the workpiece that is in electrical conduction with the portion to be eroded (see point 2 in FIG. 12). The hand-held device 10 then verifies that a closed circuit is provided by the pathway through the workpiece from the erosion electrode 66 to the ground electrode 38 (see point 3 in FIG. 12). This step verifies that the workpiece is conductive from the portion to be eroded to the portion contacted by the ground electrode 38. This step also verifies that the ground electrode 38 is in contact with the workpiece. Other methods are contemplated to verify that the ground electrode 38 is in contact with the workpiece, such as a detectable limit on the advancement of the ground electrode 38 as it contacts the workpiece, or actuating sensors at the interface between the device and the workpiece.

According to some exemplary implementations, the position of the erosion electrode 66 while it is in contact with the workpiece may be recorded and utilized as a calibration position from which the depth of cutting may be calculated. For example, the difference between (1) the position of the erosion electrode while contacting the workpiece during a calibration step and (2) the position at any given time during an erosion process may indicate the approximate depth of cutting at that given time.

According to some exemplary implementations, the erosion electrode 66 is retracted a distance from the workpiece after contacting the workpiece (see point 4 of FIG. 12). The distance of retraction may be at least about the distance anticipated for a plasma event to occur in a spark gap.

According to some exemplary implementations, flow of dielectric fluid is commenced into and out of the sealed and enclosed workspace, particularly through the spark gap. The dielectric fluid may be provided as a result of pressure provided from inlet pump 92. For example, pressure provided may result in a controllable flow rate. The flow may be initiated according to a variety of events, as disclosed herein. For example, flow may be automatically initiated by the provision of the ground electrode 38 to the workpiece, as disclosed herein. Flow may be initiated following verification that the proper conditions for plasma events are provided, as disclosed herein.

According to some exemplary implementations, the erosion electrode 66 is advanced along an axis toward the workpiece. A voltage difference across the erosion electrode 66 and the workpiece is established (see point 5 of FIG. 12). The spark gap is narrowed until the dielectric fluid breaks down and a plasma is formed across the spark gap. The flow of dielectric fluid may be constricted as the spark gap narrows (see point 6 of FIG. 12). The resultant plasma event causes erosion of the workpiece near the erosion electrode 66 (see point 7 of FIG. 12).

According to some exemplary implementations, the flow and pressure of dielectric fluid is stabilized at a positive value, to prevent in ingress of air into the workspace (see point 7 of FIG. 12).

According to some exemplary implementations, the erosion electrode 66 is recharged and advanced to create a series of plasma events, thereby eroding the workpiece until the desired cut shape is achieved. According to some exemplary implementations, the advancement of the erosion electrode 66 may be determined by its position relative to the base 26. For example, the motor 60 may advance the erosion electrode 66 relative to the base 26. The advancement may be constant, preprogrammed, or manually controlled. According to some exemplary implementations, maintenance of the gap between the erosion electrode 66 and the workpiece may be maintained to avoid shorting, facilitate dielectric breakdown, generate plasma events, and remove material from the workpiece. As needed, the erosion electrode 66 may also be retracted from the workpiece to maintain an appropriate spark gap size between the erosion electrode 66 and the workpiece. For example, if the erosion electrode 66 contacts the workpiece and shorts the electrical circuit, then the erosion electrode 66 may be retracted.

According to some exemplary implementations, operation of the hand-held device 10 as shown in FIG. 4A may provide a pilot hole as shown in FIG. 4B.

According to some exemplary implementations, operation of the hand-held device 10 as shown in FIG. 5A may facilitate separation of a flange of a fastener 18 from a shank of a fastener 18, as shown in FIG. 5B by eroding the shape of a recess 23.

According to some exemplary implementations, operation of the hand-held device 10 as shown in FIGS. 6A and 6B may facilitate separation of a shank of a fastener 18 from a collar 24 at the interface 22, as shown in FIG. 6C.

According to some exemplary implementations, operation of the hand-held device 10 as shown in FIGS. 11A and 11B may result in reduced exposure of a protrusion, as shown in FIG. 11C According to some exemplary implementations, the hand-held device 10 may deactivate some components based on the conditions sensed. For example, the lack of dielectric fluid flow may be sensed and cause the system to stop until remedied.

According to some exemplary implementations, the hand-held device 10 may deactivate some components when a programmed process is completed. When the operation is complete, the user stops actuation of the switch 30 and removes the device 10 from the proximity of the workpiece. According to some exemplary implementations, deactivation of switch 30 may cause systems and components that are not yet deactivated to become deactivated. According to some exemplary implementations, removal permits the ground tube 40 to move forward and causes the valve ball 48 to prohibit flow from the dielectric inlet 54.

Figure 13:
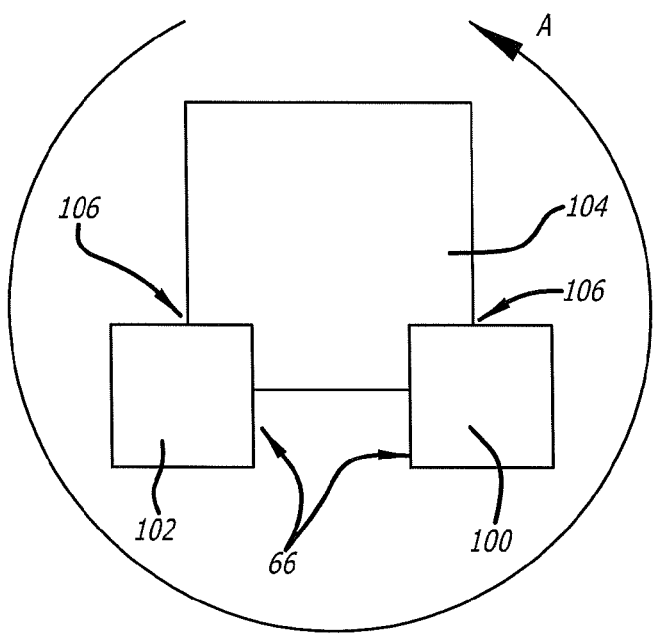
FIG. 13 shows a cross sectional view of an erosion electrode in accordance with an embodiment of the invention.
Figure 14:
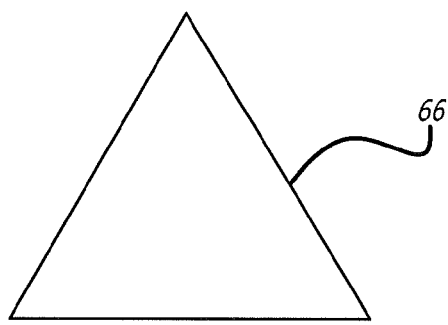
FIG. 14 shows a cross sectional view of an erosion electrode in accordance with an embodiment of the invention.
Figure 15:
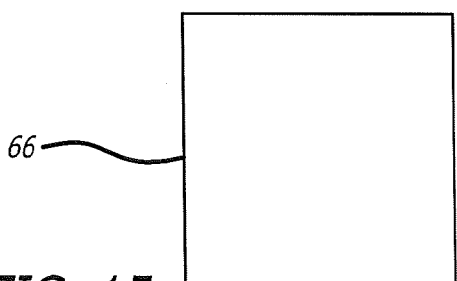
FIG. 15 shows a cross sectional view of an erosion electrode in accordance with an embodiment of the invention.

FIG. 13 is a cross sectional view illustrating an erosion electrode 66 in accordance with an embodiment of the invention. As described above, the erosion electrode 66 may be made of two electrodes 100 and 102 that rotate about an axis as illustrated by Arrow A. A rotational assembly 104 is engaged with each electrode 100 and 102 at an engaging area 106 and is configured to cause the electrodes 100 and 102 to rotate as illustrated by Arrow A. In other embodiments of the invention, the erosion electrode 66 may be triangular in cross section as illustrated in FIG. 14 and still other embodiments, the erosion electrode 66 may be square in cross section as shown by FIG. 15.

According to some exemplary implementations, the components of devices disclosed herein may be provided in any combination to accomplish desired functionality. Likewise, operations of methods disclosed may be provided in any sequence or combination to achieve results as disclosed herein.

While the method and agent have been described in terms of what are presently considered to be the most practical and preferred exemplary implementations, it is to be understood that the disclosure need not be limited to the disclosed exemplary implementations. It is intended to cover various modifications and similar arrangements included within the spirit and scope of the claims, the scope of which should be accorded the broadest interpretation so as to encompass all such modifications and similar structures. The present disclosure includes any and all exemplary implementations of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an exemplary implementation of any apparatus implementation, a method or process implementation, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

We claim:

1. A hand-held electric discharge machine (EDM) device comprising, in combination:
   a base;
   a handle attached to the base;
   a hood attached to the base at a distal end of the base, the hood being configured to enclose a workspace when brought to a workpiece;
   an erosion electrode having a distal end disposed within the workspace and moveable relative to the base along an axis;
   a ground electrode having a distal end disposed within the workspace and moveable relative to the base along the axis, wherein the ground electrode is configured to contact at least a portion of the workpiece;
   a dielectric inlet configured to deliver a dielectric fluid to between the erosion electrode and the workpiece;
   a dielectric outlet configured to evacuate the dielectric fluid;
   a ground tube in fluid connection with the workspace and slideably disposed within a valve block; and
   a valve ball selectively held against the valve block by a valve compression spring,
   wherein the ground electrode is configured to compress the valve compression spring, move the valve ball from the valve block, and introduce a flow of dielectric fluid to the workspace when the ground electrode is placed against the workpiece,
   wherein the hand-held EDM device is configured to be held by a user and brought to a workpiece.

2. The hand-held EDM device of claim 1, wherein the ground and erosion electrodes are configured to controllably approach the workpiece and the workpiece is one of a fastener and a fastener collar.

3. The hand-held EDM device of claim 1, wherein the erosion electrode further comprises at least two electrodes configured to rotate about the axis.

4. The hand-held EDM device of claim 1, further comprising a motor configured to controllably advance and retract the erosion electrode.

5. The hand-held EDM device of claim 1, further comprising an electrical contact sensor configured to detect a contact between the ground electrode and the workpiece.

6. The hand-held EDM device of claim 5, wherein the ground electrode is configured to compress a spring when contacting the workpiece, wherein the spring maintains contact between the ground electrode and the workpiece when the hood is brought to the workpiece.

7. The hand-held EDM device of claim 1, wherein the erosion electrode is a hollow tubular structure configured to erode a corresponding ring shape.

8. The hand-held EDM device of claim 7, wherein the ground electrode is aligned along a central axis of the hollow tubular structure of the erosion electrode.

9. The hand-held EDM device of claim 7, wherein at least a portion of the dielectric inlet is disposed within the hollow tubular structure of the erosion electrode.

10. An electric discharge machine (EDM) fastener removal device comprising, in combination:
    a hood fixably attached to a base at a distal end of the base, the hood being configured to enclose a workspace between the hood and a frame with at least a portion of the fastener within the workspace;
    an erosion electrode having a hollow tubular shape and having a distal end disposed within the workspace and moveable relative to the fastener;
    a ground electrode having a distal end disposed within the workspace and configured to contact at least a portion of the workpiece;
    a dielectric inlet configured to deliver a dielectric fluid to between the erosion electrode and the workpiece;
    a ground tube in fluid connection with the workspace and slideably disposed within a valve block; and
    a valve ball selectively held against the valve block by a valve compression spring,
    wherein the ground electrode is configured to compress the valve compression spring, move the valve ball from the valve block, and introduce a flow of dielectric fluid to the workspace when the ground electrode is placed against the workpiece,
    wherein the hollow tubular shape of the erosion electrode is configured to erode at least a portion of the fastener without eroding the frame.

11. The EDM fastener removal device of claim 10, wherein the erosion electrode is configured to erode an interface between a fastener flange and a fastener shank.

12. The EDM fastener removal device of claim 11, wherein the hollow tubular shape of the erosion electrode has an outer diameter about the diameter of the interface between a fastener flange and a fastener shank.

13. The EDM fastener removal device of claim 12, wherein the hollow tubular shape of the erosion electrode has an outer diameter about less than the outer diameter of the fastener shank.

14. A method for removing a fastener from a frame, comprising, in combination:
    providing a hand-held electric discharge machine (EDM) device having a hood, a ground electrode, and an erosion electrode;
    providing the hood to the frame, whereby a workspace is enclosed between the hood and the frame with at least a portion of the fastener within the workspace and a ground tube in fluid connection with the workspace and slideably disposed within a valve block; a valve ball selectively held against the valve block by a valve compression spring, wherein the ground electrode is configured to compress the valve compression spring, move the valve ball from the valve block, and introduce a flow of dielectric fluid to the workspace when the ground electrode is placed against the workpiece;
    contacting the fastener with the ground electrode;
    delivering a dielectric between the erosion electrode and the fastener;
    advancing the erosion electrode near the fastener;
    creating an electrical charge in the erosion electrode until a breakdown occurs in the dielectric fluid between the erosion electrode and the fastener, whereby a portion of the fastener is eroded into the dielectric fluid; and
    removing the dielectric containing the eroded portion of the fastener.

15. The method of claim 14, wherein the dielectric is also a coolant.

16. The method of claim 14, wherein the erosion electrode is a hollow tubular structure configured to erode a corresponding ring shape.

17. The method of claim 14, whereby the method effectuates erosion between an interface between a fastener flange and a fastener shank to facilitate removal of the fastener flange from the fastener shank.

18. The method of claim 14, whereby said eroded portion of a fastener forms a pilot hole for subsequent operations.

19. The method of claim 14, wherein the erosion electrode is configured to erode through matter selected from the group consisting of material and materials.

20. The method of claim 14, wherein the fastener is threaded.

21. The method of claim 14, wherein the erosion electrode is of a geometric shape.

22. The method of claim 21, wherein the erosion electrode is of a square shape as viewed in cross-section.

23. The method of claim 21, wherein the erosion electrode is of a triangular shape as viewed in cross-section.

* * * * *